United States Patent [19]

Raden et al.

[11] 4,430,455

[45] Feb. 7, 1984

[54] N'-(2-HYDROXYALKYL)-N, N, N'-TRIMETHYL-PROPYLENE DIAMINES AS CATALYSTS FOR POLYURETHANE FOAMS

[75] Inventors: Daniel S. Raden, Hawthorn Woods; Russell O. Carlsen, Barrington; Kenneth W. Narducy, Bloomingdale, all of Ill.

[73] Assignee: Abbott Laboratories, North Chicago, Ill.

[21] Appl. No.: 241,816

[22] Filed: Mar. 9, 1981

[51] Int. Cl.³ .................... C08G 18/14; C08G 18/22
[52] U.S. Cl. ..................... 521/118; 528/53; 564/503
[58] Field of Search ............ 521/118; 528/53; 564/503

[56] References Cited

U.S. PATENT DOCUMENTS 4,026,840  5/1977  Bechara et al. ............... 521/118

FOREIGN PATENT DOCUMENTS 2628464  1/1977  Fed. Rep. of Germany ...... 564/503

OTHER PUBLICATIONS

Jennings, Joun, Cellular Plastics, May/Jun., 1969, pp. 1–14.
Hammett, Physical Organic Chemistry, Mc Graw–Hill, N.Y. (1940), p. 96, (1st. Edition).
Hammett, Physical Organic Chemistry, 2nd., Ed. McGraw–Hill, N.Y. 1970, pp. 96, 97, 136–141, 315, 345.

*Primary Examiner*—H. S. Cockeram
*Attorney, Agent, or Firm*—Dennis K. Shelton

[57] ABSTRACT

New ditertiary aminoalcohols are useful as catalysts in the preparation of polyurethane foams. The new catalysts are particularly stable in the presence of polyols and other components often used in the conjunction with such polyols.

5 Claims, No Drawings

N'-(2-HYDROXYALKYL)-N,N,N'-TRIMETHYL-PROPYLENE DIAMINES AS CATALYSTS FOR POLYURETHANE FOAMS

The present invention is directed to the discovery of new ditertiary amine catalysts having particularly useful properties in the reaction of (poly) isocyanates with (poly) hydroxy compounds. The new compounds are distinguishable over the materials mentioned in U.S. Pat. No. 3,341,482 and U.S. Pat. No. 3,054,755 in that they contain two tertiary amino groups and a single alcoholic hydroxy group, both functions being necessary to produce the new and unusual results; they also distinguish over U.S. Pat. No. 4,101,470 which is directed to a bulkier molecule containing three tertiary amino groups. The new compounds are distinguishable from all previously known analogs such as U.S. Pat. No. 4,026,840 by being far more stable in admixture with the polyol and other components of the so-called "B-side" used in urethane polymerization.

The new compounds are those of the formula

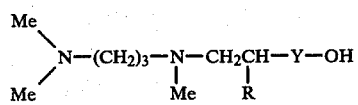

wherein R is hydrogen or methyl and Y is a methylene group or a single bond. They are particularly useful as stable catalysts in the reaction of polyisocyanates with polyols in the presence of blowing agents to make uniform, rigid polyurethane foams.

The unusual qualities of the new catalysts will best be shown by reference to the tables below and the examples which are intended only as illustrations and not to limit the invention in any respect. Wherever "parts" are used, they are parts by weight.

EXAMPLE 1

Ethylene oxide was bubbled into a solution of 11.6 g. N,N,N'-trimethyl-propane-1,3-diamine in 50 ml. dry dioxane until the weight gain was about 4.4 g. The reaction mixture was then stripped in vacuo and the residue distilled. The colorless oil was identified by nmr and infrared analyses as N,N,N'-trimethyl-N'-(2-hydroxyethyl)-propane-1,3-diamine, boiling at 58°-64° C./0.5 mm.

EXAMPLE 2

To a solution of 11.6 g. N,N,N'-trimethylpropane-1,3-diamine in 50 ml. dry dioxane was added 7.25 g. propylene oxide. The reaction mixture was heated for 3 hours at reflux, then cooled and stripped in vacuo. The residue was distilled and then collected as colorless N,N,N'-trimethyl-N'-(2-hydroxypropyl)propane-1,3-diamine; b.p. 78°-82° C./2 mm.

EXAMPLE 3

Under stirring, 15 g. ethyl acrylate was added to 11.6 g. N,N,N'-trimethyl-propane-1,3-diamine. Stirring was continued 8 hours at room temperature and the mixture was then heated to 80° C. for 16 hours before stripping the solvent in vacuo. The residue was dissolved in 75 ml. ether and added to a slurry of 2.1 g. LiAlH$_4$ in 100 ml. of ether. This mixture was refluxed 2 hours. After cooling, ethyl acetate and then aqueous HCl were added and the mixture was stirred one hour. The clear, two-phase system was separated. The organic layer was dried over MgSO$_4$, filtered, stripped of solvent, and the residue was distilled at 70°-75° C./0.4 mm, producing pure N,N,N'-trimethyl-N'-(3-hydroxypropyl)propane-1,3-diamine.

EXAMPLE 4

A mixture of 100 parts of a polyoxypropylene polyol of functionality f=4.4 (marketed by Dow Chemical Co. as Voranol ® 490), 1.5 parts of a silicone-glycol copolymer surfactant (marketed by Dow-Corning Corp. as DC-195), 36.5 part of trichlorofluoromethane and 1.6% (based on the polyol weight) of the above catalysts were premixed for 10 seconds. To this was added 122.8 parts of a mixture of aromatic polyisocyanates having an average isocyanate content of 31.5% (marketed by Mobay Chemical Co. as Mondur ® MR) and the batch was stirred 10 seconds at 3000 rpm using a 1⅞" lo-lift blade in a 28 oz. enamel-coated #2½ food-pack type can which is then placed in a Fluidyne rise/rate apparatus, giving the results shown in Table I. The above catalysts were all tested under these conditions, which conditions were also used for comparative purposes with N,N,N'-trimethyl-N'-(2-hydroxyethyl)-ethane-1,2-diamine, referred to as TMAEEA in the above mentioned U.S. Pat. No. 4,026,840, a compound differing from the above as having an ethylene group between the two tertiary amino groups.

TABLE I

| Catalyst | Eq. Wt. | Eq. Wt. (A) | Final Height (inch) | Initiation Time (sec.) | Rise Time (sec.) | Maximum Rise Rate (in./min.) | Specific Rise Rate (min$^{-1}$) |
|---|---|---|---|---|---|---|---|
| TMAEEA | 73 | — | 15.4 | 84 | 137 | 23.42 | 1.52 |
| Example 1 | 80 | +9.6% | 15.2 | 80 | 132 | 24.89 | 1.64 |
| Example 2 | 87 | +19.2% | 14.9 | 82 | 133 | 23.42 | 1.58 |
| Example 3 | 87 | +19.2% | 15.4 | 65 | 110 | 26.35 | 1.71 |

(A) Equivalent weight differences to that of TMAEEA

TABLE II

| Catalyst | Eq. Wt. (A) | Initiation Time (sec.) | Rise Time (sec.) | Maximum Rise Rate (in./min.) | Specific Rise Rate (min$^{-1}$) |
|---|---|---|---|---|---|
| Example 1 | +9.6% | −4.8% | −3.6% | +6.3% | +7.9% |
| Example 2 | +19.2% | −2.4% | −2.9% | 0% | +3.9% |
| Example 3 | +19.2% | −22.6% | −19.7% | +12.5% | +12.5% |

(A) Equivalent weight differences to that of TMAEEA

Table I shows the totally unexpected superiority of the new catalysts with the characteristics obtained by using TMAEEA, although the current catalysts are used at identical weights with the latter. Expressed differently, the new catalysts are 9.6 and 19.2%, respectively, more active than TMAEEA, based on equivalent weights.

Table II brings their status even more in focus. In that table, the differences in times, rates, etc. are given over those of TMAEEA, demonstrating the improved values in rise time, specific and maximum rise rate, and initiation time.

In addition, the new compounds exhibit another fully unexpected characteristic, further differentiating them over previously known catalysts, as shown in the following Example.

EXAMPLE 5

In order to be acceptable to the polyurethane industry, a catalyst must not cause instability in admixture with the polyols used for this polymerization and it must retain substantially all its activity over a reasonable period of time after being placed in intimate mixture with the polyol and the blowing agent. This will give the operator time to premix the B-side of the polymerization reaction in larger batches prior to the use of this mix in the reaction with the isocyanate and to store the B-side in metal containers for extended periods.

The above catalysts, as well as N,N-bis(3-dimethylaminopropyl)-N-β-propanol (called DNP below) were placed in identical polyol mixtures containing a carbon steel coupon ($\frac{1}{2}"\times 1"\times\frac{1}{4}"$), trichlorofluoromethane but no inhibitors. The catalytic activity was tested at the onset and after keeping the mixture for the shown number of hours at 43° C. in a pressure vessel. A reaction system similar to that of Example 4 was used. Table III below shows the chloride ion levels and the cream time/rise time values at 4% catalyst levels based on the amount of polyol.

TABLE III

| Catalyst | Time from Start of Test (hrs.) | Cl⁻ (A) Concentration | Cream/Rise Time (sec) |
| --- | --- | --- | --- |
| TMAEEA | 0 | 0.06 | 12/34 |
| | 200 | 0.71 | 55/600 |
| Example 1 | 0 | 0.021 | 11/29 |
| | 240 | 0.095 | 12/30 |
| | 336 | 0.14 | 12/34 |
| Example 3 | 0 | 0.04 | 9/26 |
| | 220 | 0.059 | |
| | 224 | — | 10/27 |
| DNP | 0 | 0.062 | 11/31 |
| | 220 | 0.80 | 26/115 |
| | 244 | 1.52 | 27/130 |

(A) The reduction in catalytic activity comes about by reaction of the CCl₃F with polyol, catalyzed by metal and/or amine, leading to acidic particles which attack the most basic material available, i.e., the amine. The amine salt thus produced is less effective as a catalyst in this system. Thus, the increase in Cl⁻ is paralleled by a decrease in catalytic activity, as is shown by the data in the table.

The above examples demonstrate that the new compounds not only are significantly more potent as urethane catalysts than closely related analogs, but they are also far superior for this use because of their totally surprising stability in admixture with other ingredients used in the polyol side of the polyurethane reaction components.

While the above catalytic activity is shown in conjunction with a particular set of reactants, it will be appreciated that other reactants may replace the above. Primarily, the above polyol can be replaced by others such as a polyoxypropylene polyol of OH-number 600–630 based on a sucrose/amine initiator (solid as Voranol ® 575 by Dow Chemical Co.), a polyether polyol of OH-number 350–370 based on a mixed sucrose/diol initiator (sold as Voranol ® 360), a polyoxypropylene polyol of OH-number of about 530 based on a sucrose/amine initiator (marketed by Olin Corp. as Poly G ® 71-530), a polyoxypropylene polyol of OH-number 500, based on a sucrose/amine initiator (marketed by BASF-Wyandotte Corp. as Pluracol ® 364) and others described in U.S. Pat. No. 4,087,389. Equally, the above polyisocyanate can be replaced by toluene diisocyanate such as that marketed by Mobay Chemical Co. as MONDUR ® TD-80 and the like. Also, the above CFCl₃ can be replaced by other blowing agents, including water or other poly halogenated alkanes. The formulations may also contain flame retardants, coloring components or fillers. Other catalysts may be used in conjunction with the above, particularly the frequently used organo-tin compounds, but also suitable inorganic tin salts. They latter are usually employed in amounts of 0.05–1.5% by weight based on the polyol.

The new catalysts are preferably used in amounts of from 0.05 to 10.0% by weight based on the polyol employed. Larger amounts could be used but no advantage is seen in such excess. With amounts below 0.05%, the reaction between the isocyanate and the hydroxy groups is too slow for commercial use. The preferred amount of the new catalysts in polyurethane formulations is 1.0–5.0% based on the weight of the polyol.

As seen from the above tables, the new catalysts are unique in their catalytic ability in the promotion of urethane formation as well as in their unexcelled stability. There characteristics are even more surprising when compared with those of the closest homologs and analogs, as shown above. Neither their higher reactivity on a nitrogen equivalent basis nor the vastly improved stability, could in the least be expected from the patterns set by the analogs considered above or any others.

I claim:

1. The method for manufacturing a polyurethane foam consisting essentially in carrying out the reaction between a polyol and a polyisocyanate in the presence of a catalytic amount of a compound of the formula

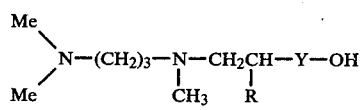

wherein R is hydrogen or methyl and Y stands for a single bond or a methylene group.

2. The method of claim 1 wherein R is H and Y is a single bond.

3. The method of claim 1 wherein R is H and Y is methylene.

4. The method of claim 1 whrein R is methyl and Y is a single bond.

5. The method of claim 1 wherein said catalyst is used in an amount of between 0.05 and 10.0% by weight of said polyol.

* * * * *